(12) United States Patent
Li et al.

(10) Patent No.: US 10,638,351 B2
(45) Date of Patent: Apr. 28, 2020

(54) SERVICE RATE ADJUSTMENT METHOD AND APPARATUS

(71) Applicant: Huawei Technologies Co., Ltd., Shenzhen (CN)

(72) Inventors: Yunfei Li, Xi'an (CN); Ming Li, Shanghai (CN); Dongfang Shen, Chengdu (CN); Shaohua Luo, Milan (IT); Libin Zhang, Beijing (CN); Guozheng Wang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/836,419

(22) Filed: Dec. 8, 2017

(65) Prior Publication Data
US 2018/0103389 A1   Apr. 12, 2018

Related U.S. Application Data

(63) Continuation of application No. PCT/CN2016/082490, filed on May 18, 2016.

(30) Foreign Application Priority Data

Jun. 10, 2015   (CN) .......................... 2015 1 0315149

(51) Int. Cl.
*H04W 28/02* (2009.01)
*H04L 1/00* (2006.01)
(Continued)

(52) U.S. Cl.
CPC ........... *H04W 28/0215* (2013.01); *H04L 1/00* (2013.01); *H04L 1/0014* (2013.01);
(Continued)

(58) Field of Classification Search
None
See application file for complete search history.

(56) References Cited

U.S. PATENT DOCUMENTS 6,889,050 B1 *  5/2005  Willars .................. H04L 47/10
                                                      370/329
7,984,179 B1 *  7/2011  Huang ............... H04N 21/2662
                                                      709/231
(Continued)

FOREIGN PATENT DOCUMENTS

CN      101754264 A      6/2010
CN      101997644 A      3/2011
(Continued)

OTHER PUBLICATIONS

Schulzrinne et al.,"RTP: A Transport Protocol for Real-Time Applications," Network Working Group, RFC3550, Obsoletes: 1889, Category: Standards Track, pp. 1-89, The Internet Society, (Jul. 2003).
(Continued)

*Primary Examiner* — Ayaz R Sheikh
*Assistant Examiner* — Tarell A Hampton
(74) *Attorney, Agent, or Firm* — Leydig, Voit & Mayer, Ltd.

(57) ABSTRACT

Embodiments of the present disclosure provide a service rate adjustment method and an apparatus. The service rate adjustment method in the present disclosure includes: receiving actual transmission capability information of a base station sent by the base station; and adjusting a service rate of a transmit end according to the actual transmission capability information and the service rate of the transmit end that sends service data to the base station. According to the embodiments of the present disclosure, rate adjustment for the transmit end that sends service data to the base station can be implemented, so that the service rate of the transmit
(Continued)

Obtain actual transmission capability information of a base station   — Step 201

Send the actual transmission capability information of the base station to an SBC   — Step 202 end that sends the service data to the base station matches an actual transmission capability of the base station, thereby improving data transmission quality.

6 Claims, 7 Drawing Sheets

(51) Int. Cl.
    *H04L 29/06*     (2006.01)
    *H04W 28/06*     (2009.01)
    *H04W 28/22*     (2009.01)

(52) U.S. Cl.
    CPC ........... *H04L 65/608* (2013.01); *H04W 28/06* (2013.01); *H04W 28/22* (2013.01); *H04W 28/0268* (2013.01)

(56) References Cited

U.S. PATENT DOCUMENTS

| | | | | |
|---|---|---|---|---|
| 9,026,110 | B1* | 5/2015 | Nehme Antoun | H04W 60/04 455/435.1 |
| 2001/0043577 | A1* | 11/2001 | Barany | H04W 28/22 370/328 |
| 2003/0017831 | A1* | 1/2003 | Lee | H04L 47/10 455/453 |
| 2003/0063569 | A1* | 4/2003 | Kalliokulju | H04L 29/06027 370/252 |
| 2003/0232624 | A1* | 12/2003 | Toskala | H04W 28/22 455/509 |
| 2005/0276249 | A1* | 12/2005 | Damnjanovic | H04L 1/1841 370/335 |
| 2006/0268837 | A1 | 11/2006 | Larsson et al. | |
| 2008/0013528 | A1* | 1/2008 | Miller | H04W 28/22 370/352 |
| 2008/0089327 | A1* | 4/2008 | Lu | H04L 45/7453 370/389 |
| 2008/0192763 | A1* | 8/2008 | Davis | H04L 12/2801 370/412 |
| 2010/0172332 | A1 | 7/2010 | Rao | |
| 2011/0141890 | A1* | 6/2011 | Giaretta | H04W 28/20 370/232 |
| 2012/0115484 | A1* | 5/2012 | Takahashi | H04W 36/08 455/436 |
| 2013/0091526 | A1 | 4/2013 | Iyer et al. | |
| 2013/0201933 | A1* | 8/2013 | Dennert | H04W 8/082 370/329 |
| 2014/0050154 | A1* | 2/2014 | Gunnarsson | H04L 41/14 370/328 |
| 2014/0269510 | A1 | 9/2014 | Xu et al. | |
| 2015/0092575 | A1 | 4/2015 | Khay-Ibbat et al. | |
| 2015/0382267 | A1* | 12/2015 | Wang | H04W 28/08 455/436 |
| 2017/0325120 | A1* | 11/2017 | Szilagyi | H04W 28/24 |

FOREIGN PATENT DOCUMENTS

| | | |
|---|---|---|
| CN | 101998537 A | 3/2011 |
| CN | 102055740 A | 5/2011 |
| CN | 102256314 A | 11/2011 |
| CN | 102308552 A | 1/2012 |
| CN | 102625459 A | 8/2012 |
| CN | 102667925 A | 9/2012 |
| EP | 2472800 A1 | 7/2012 |
| EP | 2519049 A1 | 10/2012 |
| JP | 2008543168 A | 11/2008 |
| WO | 2011053222 A1 | 5/2011 |
| WO | 2012049921 A1 | 4/2012 |
| WO | 2013014246 A1 | 1/2013 |
| WO | 2014200397 A1 | 12/2014 |
| WO | 2016144246 A1 | 9/2016 |

OTHER PUBLICATIONS

Komaki et al., "A QoS Control for Wireless Streaming with Intermediary Network Information," pp. 83-89 (2002). With English Abstract.

Gui, "IP Phone Technology and Softswitch," Beijing University of Posts and Telecommunications Press, Beijing, China (2004).

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P| subtype |   PT=APP=204  |             length            |
+-+-+-+-+-+-+-+-+-+-+-+-+-+-+-+-+-+-+-+-+-+-+-+-+-+-+-+-+-+-+-+-+
|                           SSRC/CSRC                           |
+-+-+-+-+-+-+-+-+-+-+-+-+-+-+-+-+-+-+-+-+-+-+-+-+-+-+-+-+-+-+-+-+
|                           name (ASCII)                        |
+-+-+-+-+-+-+-+-+-+-+-+-+-+-+-+-+-+-+-+-+-+-+-+-+-+-+-+-+-+-+-+-+
|                   application-dependent data               ...
+-+-+-+-+-+-+-+-+-+-+-+-+-+-+-+-+-+-+-+-+-+-+-+-+-+-+-+-+-+-+-+-+
```

FIG. 13

SERVICE RATE ADJUSTMENT METHOD AND APPARATUS

CROSS-REFERENCE TO RELATED APPLICATIONS

This application is a continuation of International Application No. PCT/CN2016/082490, filed on May 18, 2016, which claims priority to Chinese Patent Application No. 201510315149.3, filed on Jun. 10, 2015, both of which are hereby incorporated by reference in their entireties.

TECHNICAL FIELD

Embodiments of the present disclosure relate to communications technologies, and in particular, to a service rate adjustment method and an apparatus.

BACKGROUND

With the development of data communications and multimedia service requirements, fourth generation mobile communications meeting operation needs of mobile data, mobile computing, and mobile multimedia initiates to emerge. The fourth generation mobile communication technology (4G) includes two standards: time division long term evolution (TD-LTE) and frequency-division duplex long term evolution (FDD-LTE). 4G integrates 3G and WLAN, and can be used to perform fast transmission of data, a high quality audio, a high quality video, a high quality image, and the like.

Voice over LTE (VoLTE) is an LTE voice solution based on an IP multimedia subsystem (IMS) network. The VoLTE is essentially different from a 2G or 3G audio call. The VoLTE is an end-to-end voice solution based on a 4G network on an all-IP condition.

FIG. 1 is a signaling interaction diagram of an existing VoLTE call flow. As shown in FIG. 1, in a call process, user equipment (UE) sends an INVITE message to a proxy-call session control function (P-CSCF)/session border controller (SBC) by using Session Initiation Protocol (SIP) signaling. The INVITE message includes codec information. For adaptive multirate narrowband (AMR-NB) and adaptive multirate wideband (AMR-WB) codecs, the message carries rate set information supported by the UE. An IMS sends the INVITE message to a peer end, that is, sends codec information to the peer end, and performs voice bearer plane codec negotiation by using the SIP signaling. Then, the P-CSCF/SBC receives a response message 180 fed back by the peer end, and the response message 180 carries bearer plane codec information returned by the peer end. The P-CSCF/SBC sends the response message 180 to the UE. In this way, by using SIP signaling negotiation, the UE, the P-CSCF/SBC, and the peer end learn codec information used for a current call. If the codec information is an AMR-NB or AMR-WB codec, the rate set information is further obtained. Subsequently, after the call is connected, bearer plane interaction is performed according to a result of the SIP signaling negotiation. In the foregoing process, an evolved NodeB (eNB) and a serving gateway (S-GW)/PDN-Gateway (P-GW) transfer signaling and bearer information. A signaling and bearer GPRS tunneling protocol (GTP tunnel) tunnel is established between the eNB and the S-GW/P-GW. When receiving an uplink packet sent by the UE, the eNB transfers the uplink packet to the S-GW/P-GW by using a GTP tunnel, and the S-GW/P-GW sends the uplink packet to the P-CSCF/SBC. When sending a downlink packet to the UE, the P-CSCF/SBC first sends the downlink packet to the S-GW/P-GW, the S-GW/P-GW sends the downlink packet to the eNB by using a GTP tunnel, and the eNB transfers the downlink packet to the UE by using an air interface.

In the foregoing all-IP voice solution, the eNB and the S-GW/P-GW are responsible only for transferring an IP packet (including signaling and a bearer). In the foregoing all-IP voice solution, a service rate cannot be dynamically adjusted according to transmission quality of an air interface of the eNB. This results in a problem of a packet loss, a long delay, or a low resource utilization rate caused by a mismatch between an actual transmission capability of the eNB and the service rate.

SUMMARY

Embodiments of the present disclosure provide a service rate adjustment method and an apparatus, so as to implement adjustment on a service rate of a transmit end that sends service data to a base station, so that the service rate of the transmit end matches an actual transmission capability of the base station.

According to a first aspect, an embodiment of the present disclosure provides a service rate adjustment method, including:

receiving actual transmission capability information of a base station sent by the base station; and adjusting a service rate of a transmit end according to the actual transmission capability information and the service rate of the transmit end that sends a service packet to the base station.

With reference to the first aspect, in a first possible implementation of the first aspect, the transmit end that sends a service packet to the base station is a terminal, and the adjusting a service rate of a transmit end according to the actual transmission capability information and the service rate of the transmit end that sends a service packet to the base station includes:

increasing or decreasing a service rate of the terminal according to the actual transmission capability information; and sending a rate adjustment request message to the terminal, where the rate adjustment request message includes an increased or a decreased service rate.

With reference to the first aspect, in a second possible implementation of the first aspect, the transmit end that sends a service packet to the base station is a session border controller SBC, and the adjusting a service rate of a transmit end according to the actual transmission capability information and the service rate of the transmit end that sends a service packet to the base station includes:

if the SBC does not perform codec conversion processing, increasing or decreasing a service rate of a peer device according to the actual transmission capability information; and sending a rate adjustment request message to the peer device, where the rate adjustment request message includes an increased or a decreased service rate; or if the SBC performs codec conversion processing, increasing or decreasing a service rate of the SBC according to the actual transmission capability information, and sending the service packet to a terminal at an increased and a decreased service rate.

With reference to any one of the first aspect, or the first to the second possible implementations of the first aspect, in a third possible implementation of the first aspect, the receiving actual transmission capability information of a base station sent by the base station includes:

receiving a first application-defined Real-Time Transport Control Protocol packet (RTCP APP packet) sent by the base station, and obtaining the actual transmission capability information of the base station from the first RTCP APP packet, where the actual transmission capability information includes current transmission quality information of an air interface or service rate information expected by an air interface.

With reference to the third possible implementation of the first aspect, in a fourth possible implementation of the first aspect, the method further includes:

sending a second RTCP APP packet to the base station, where the second RTCP APP packet carries the increased or decreased service rate.

According to a second aspect, an embodiment of the present disclosure provides a service rate adjustment method, including:

obtaining actual transmission capability information of a base station; and sending the actual transmission capability information of the base station to a session border controller SBC, where the actual transmission capability information is used by the SBC to adjust a service rate of a transmit end according to the actual transmission capability information and the service rate of the transmit end that sends a service packet to the base station.

With reference to the second aspect, in a first possible implementation of the second aspect, the sending the actual transmission capability information of the base station to an SBC includes:

adding the actual transmission capability information of the base station to a first RTCP APP packet, and sending the first RTCP APP packet to the SBC, where the actual transmission capability information includes current transmission quality information of an air interface or service rate information expected by an air interface.

With reference to the second aspect, or the first possible implementation of the second aspect, in a second possible implementation of the second aspect, the method further includes:

receiving a second RTCP APP packet sent by the SBC, where the second RTCP APP packet carries an increased or a decreased service rate, and the increased or decreased service rate is a service rate obtained after the SBC adjusts the service rate of the transmit end according to the actual transmission capability information and the service rate of the transmit end that sends a service packet to the base station.

According to a third aspect, an embodiment of the present disclosure provides a session border controller SBC, including:

a receiving module, configured to receive actual transmission capability information of a base station sent by the base station; and a processing module, configured to adjust a service rate of a transmit end according to the actual transmission capability information and the service rate of the transmit end that sends a service packet to the base station.

With reference to the third aspect, in a first possible implementation of the third aspect, the transmit end that sends a service packet to the base station is a terminal, and the processing module is specifically configured to increase or decrease a service rate of the terminal according to the actual transmission capability information; and the SBC further includes a sending module, where the sending module is configured to send a rate adjustment request message to the terminal, and the rate adjustment request message includes an increased or a decreased service rate.

With reference to the third aspect, in a second possible implementation of the third aspect, the transmit end that sends a service packet to the base station is the session border controller SBC, where the processing module is specifically configured to:

if the SBC does not perform codec conversion processing, increase or decrease a service rate of a peer device according to the actual transmission capability information; and the SBC further includes a sending module, configured to send a rate adjustment request message to the peer device, where the rate adjustment request message includes an increased or a decreased service rate; or the processing module is specifically configured to:

if the SBC performs codec conversion processing, increase or decrease a service rate of the SBC according to the actual transmission capability information, and send the service packet to a terminal at an increased or a decreased service rate.

With reference to any one of the third aspect, or the first to the second possible implementations of the third aspect, in a third possible implementation of the third aspect, the receiving module is specifically configured to:

receive a first RTCP APP packet sent by the base station, and obtain the actual transmission capability information of the base station from the first RTCP APP packet, where the actual transmission capability information includes current transmission quality information of an air interface or service rate information expected by an air interface.

With reference to the third possible implementation of the third aspect, in a fourth possible implementation of the third aspect, the sending module is further configured to:

send a second RTCP APP packet to the base station, where the second RTCP APP packet carries the increased or decreased service rate.

According to a fourth aspect, an embodiment of the present disclosure provides a base station, including:

a processing module, configured to obtain actual transmission capability information of the base station; and a sending module, configured to send the actual transmission capability information of the base station to a session border controller SBC, where the actual transmission capability information is used by the SBC to adjust a service rate of a transmit end according to the actual transmission capability information and the service rate of the transmit end that sends a service packet to the base station.

With reference to the fourth aspect, in a first possible implementation of the fourth aspect, the sending module is specifically configured to:

add the actual transmission capability information of the base station to a first RTCP APP packet, and send the first RTCP APP packet to the SBC, where the actual transmission capability information includes current transmission quality information of an air interface or service rate information expected by an air interface.

With reference to the fourth aspect or the first possible implementation of the fourth aspect, in a second possible implementation of the fourth aspect, the base station further includes a receiving module, configured to:

receive a second RTCP APP packet sent by the SBC, where the second RTCP APP packet carries an increased or a decreased service rate, and the increased or decreased service rate is a service rate obtained after the SBC adjusts the service rate of the transmit end according to the actual transmission capability information and the service rate of the transmit end that sends a service packet to the base station.

According to the service rate adjustment method and the apparatus in the embodiments of the present disclosure, the SBC obtains the actual transmission capability information of the base station, and adjusts, according to the actual transmission capability information of the base station, the service rate of the transmit end that sends a service packet to the base station, so that the service rate of the transmit end that sends a service packet to the base station matches the actual transmission capability of the base station, thereby improving service data transmission quality.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

FIG. 13 is a specific RTCP APP packet format, according to one embodiment.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
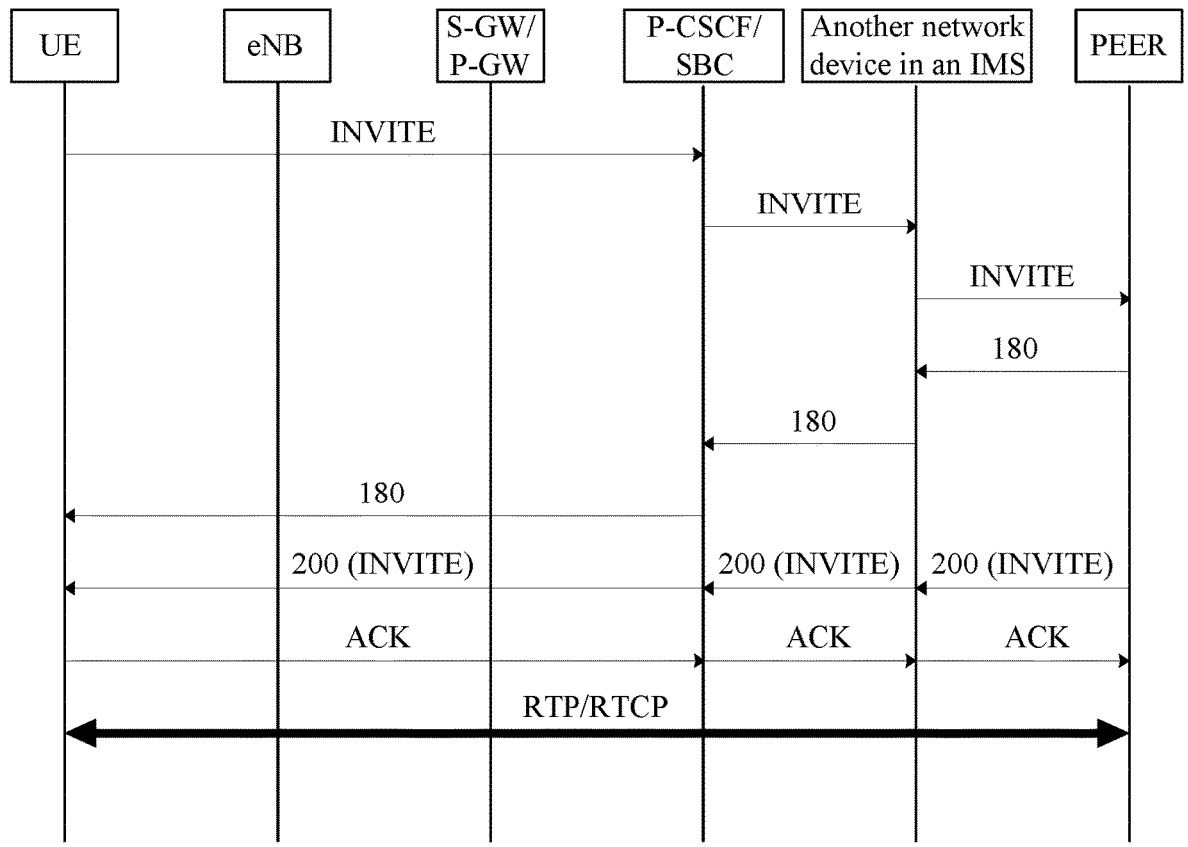
FIG. 1 is a signaling interaction diagram of an existing VoLTE call flow.
Figure 2:
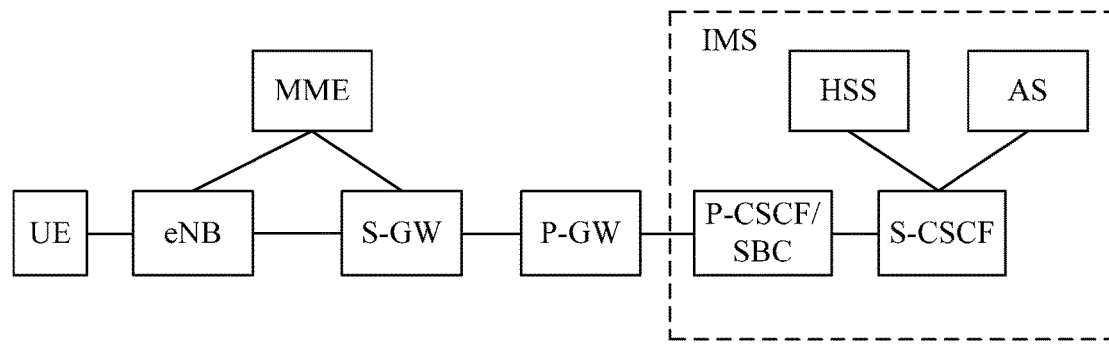
FIG. 2 is a schematic diagram of a network architecture according to an embodiment of the present disclosure.

FIG. 2 is a schematic diagram of a network architecture according to an embodiment of the present disclosure. The network architecture in this embodiment of the present disclosure is an LTE network architecture. Specifically, user equipment (UE) accesses an evolved packet core (EPC) by using an evolved NodeB (eNB). The EPC includes multiple network entities, such as a mobility management entity (MME), an S-GW, and a P-GW. A connection relationship between network entities in the EPC and an evolved universal terrestrial radio access network (E-UTRAN) is specifically: the MME is connected to the eNB, the S-GW is connected to the eNB, the MME is connected to the S-GW, and the S-GW is connected to an IMS by using the P-GW. The IMS includes a P-CSCF/SBC, a serving-call session control function (S-CSCF), a home subscriber server (HSS), and the like. Specifically, the P-CSCF/SBC is separately connected to the P-GW and the S-CSCF, and the S-CSCF is further connected to the HSS and an application server (AS). In this network architecture, main functions of the eNB include: a radio resource management function (which implements radio bearer control, radio permission control, and connection mobility control); compression and encryption of an IP header of a user data stream; selection of an MME when UE is in an attached state; implementation of route selection for S-GW user plane data; execution of scheduling and transmission of paging information and broadcast information initiated by the MME; and completion of measurement and a measurement report of a mobility configuration and scheduling; and the like. Main functions of the MME include: encryption and integrity protection of non-access stratum (NAS) signaling; access stratum (AS) security control, and idle state mobility control; evolved packet system (EPS) bearer control; support for paging, a handover, roaming, and authentication; and the like. Main functions of the S-GW include: routing and forwarding of packet data; support for mobility and a handover; charging; and the like. Main functions of the P-GW include: packet data filtering; allocation of an IP address to UE; uplink and downlink charging and rate limiting; and the like.

Call session control functions (CSCF) may be classified into three types according to locations and functions of the call session control functions: a P-CSCF, an S-CSCF, and an I-CSCF. P-CSCF (Proxy CSCF): The P-CSCF is the first connection point in the IMS to a user, and provides a proxy function, that is, accepts a service request and forwards the accepted service request. S-CSCF (Serving CSCF): The S-CSCF is in a core control position in an IMS core network and responsible for registration authentication and session control on the UE, executes a basic session routing function for originating end and terminating end IMS users, and when a condition is met, performs triggering of value-added service routing to an AS, service control, and service interaction according to an IMS triggering rule subscribed by a user. I-CSCF (Interrogating CSCF): Similar to a gateway node of the IMS, the I-CSCF provides functions of local-domain user service node allocation, route query, and IMS inter-domain topology hiding.

The HSS is a centralized comprehensive database that is in a home network and that stores subscription information of an IMS user, including a basic identifier, routing information, service subscription information, and the like. The AS (Application Server) provides an IMS value-added service for an IMS subscriber. The AS may be located in a user home network, or may be provided by a third party.

It should be noted that the P-CSCF and the SBC may be separately deployed, or may be integrated. Generally, the P-CSCF and the SBC are integrated. Therefore, the SBC in this embodiment of the present disclosure may be a physical device in which the P-CSCF and the SBC are integrated, or may be an independent SBC device, and this is not limited herein.

In the present disclosure, a VoLTE service rate is adjusted based on the network architecture shown in FIG. 2. For details, refer to explanatory descriptions in the following embodiments.

Figure 3:
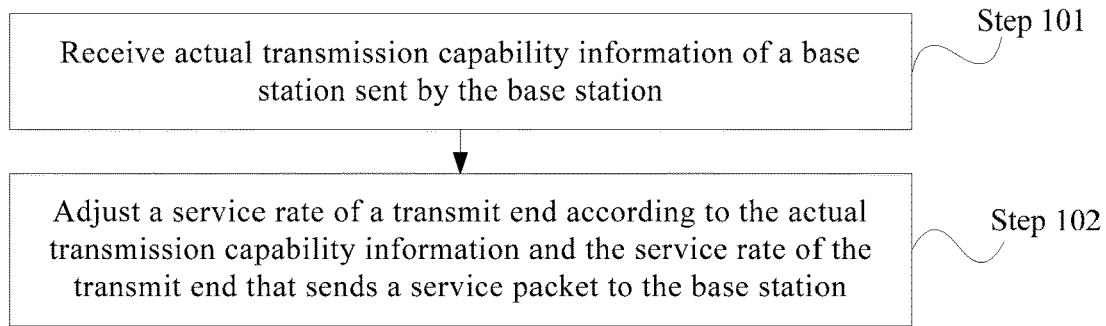
FIG. 3 is a flowchart of a first embodiment of a service rate adjustment method according to the present disclosure.

FIG. 3 is a flowchart of a first embodiment of a service rate adjustment method according to the present disclosure, and this embodiment is executed by an SBC. As shown in FIG. 3, the method in this embodiment may include the following steps.

Step 101: Receive actual transmission capability information of a base station sent by the base station.

The actual transmission capability information may include current transmission quality information of an air interface or service rate information expected by an air interface. The current transmission quality information of the air interface may be specifically: current transmission quality of the air interface is good, current transmission quality of the air interface is normal, current transmission of the air interface is slightly abnormal, current transmission of the air interface is abnormal, current transmission of the air interface is severely abnormal, or the like. The service rate information expected by the air interface may be a specific rate value. The rate value is used to reflect a magnitude of a data transmission capability that can be provided by the base station for a data service of a user, so as to make full use of an air interface resource for service data transmission. The service rate information expected by the air interface may be obtained by the base station according to a traffic volume and transmission quality of a cell.

Specifically, the base station obtains the actual transmission capability information of the base station, and the base station sends the actual transmission capability information of the base station to the SBC. The base station may obtain the actual transmission capability information in real time. In an implementable manner, the base station sends the obtained actual transmission capability information to the SBC in real time. In another implementable manner, the base station obtains current actual transmission capability information in real time, and compares the actual transmission capability information with previously obtained actual transmission capability information; and if the actual transmission capability information is different from the previously obtained actual transmission capability information, the base station sends the current actual transmission capability information of the base station to the SBC. That is, the base station may send, to the SBC after learning that quality of the air interface between the base station and a terminal changes, the current transmission quality information of the air interface or the service rate information expected by the air interface. A specific setting may be flexibly made according to a requirement.

Step 102: Adjust a service rate of a transmit end according to the actual transmission capability information and the service rate of the transmit end that sends a service packet to the base station.

Specifically, the service rate of the transmit end is adjusted according to the received actual transmission capability information with reference to the service rate of the transmit end that sends a service packet to the base station. The service rate of the transmit end that sends a service packet to the base station is a service rate obtained by depacketizing a service packet by the SBC. The service rate specifically refers to a size of service packets that need to be transferred per second. For example, an example in which a terminal initiates a voice service is used herein for schematic description, and the actual transmission capability information of the base station is that the current transmission of the air interface is slightly abnormal. The service rate of the transmit end that sends a service packet to the base station needs to be decreased, and in this case, the transmit end is the terminal, that is, the service rate of the terminal needs to be decreased. Specifically, an amount by which the service rate of the terminal is to be decreased or a decreased service rate at which data transmission is to be performed needs to be determined with reference to codec rate set information of the terminal. The codec rate set information includes multiple pieces of rate information supported by the terminal. For example, for a codec of adaptive multirate narrowband (AMR-NB), there are eight rates for the AMR-NB: 4.75K, 5.15K, 5.90K, 6.70K, 7.40K, 7.95K, 10.2K, and 12.2K. For details, refer to Table 1. For a codec of adaptive multirate wideband (AMR-WB), there are nine rates for the AMR-WB: 6.6K, 8.85K, 12.65K, 14.25K, 15.85K, 18.25K, 19.85K, 23.05K, and 23.85K. For details, refer to Table 2. Specifically, the terminal may support one or more of these rates. That is, when the service rate of the terminal needs to be decreased, the codec rate set information of the terminal may use a service rate that is lower than a service rate used before the adjusting and that belongs to the codec rate set.

TABLE 1

| Frame type | AMR-NB codec mode | Total number of bits | Class A | Class B | Class C |
|---|---|---|---|---|---|
| 0 | 4.75 | 95 | 42 | 53 | 0 |
| 1 | 5.15 | 103 | 49 | 54 | 0 |
| 2 | 5.90 | 118 | 55 | 63 | 0 |
| 3 | 6.70 | 134 | 58 | 76 | 0 |
| 4 | 7.40 | 148 | 61 | 87 | 0 |
| 5 | 7.95 | 159 | 75 | 84 | 0 |
| 6 | 10.2 | 204 | 65 | 99 | 40 |
| 7 | 12.2 | 244 | 81 | 103 | 60 |

TABLE 2

| Frame type | AMR-WB codec mode | Total number of bits | Class A | Class B | Class C |
|---|---|---|---|---|---|
| 0 | 6.60 | 132 | 54 | 78 | 0 |
| 1 | 8.85 | 177 | 64 | 113 | 0 |
| 2 | 12.65 | 253 | 72 | 181 | 0 |
| 3 | 14.25 | 285 | 72 | 213 | 0 |
| 4 | 15.85 | 317 | 72 | 245 | 0 |
| 5 | 18.25 | 365 | 72 | 293 | 0 |
| 6 | 19.85 | 397 | 72 | 325 | 0 |
| 7 | 23.05 | 461 | 72 | 389 | 0 |
| 8 | 23.85 | 477 | 72 | 405 | 0 |

In this embodiment, which is different from the prior art, the SBC may obtain the actual transmission capability information of the base station, and the SBC may perform adaptive adjustment on the service rate of the transmit end with reference to the actual transmission capability information of the base station according to the obtained service rate of the transmit end that sends a service packet to the base station, so that the service rate of the transmit end that sends a service packet to the base station matches an actual transmission capability of the base station, thereby improving data transmission quality.

Further, in a process of implementing VoLTE, data received by the base station may be an uplink service packet sent by the terminal, or may be a downlink service packet sent by a core network side. The uplink service packet is sent by the terminal, and specifically, the terminal sends the uplink service packet to the base station, and the base station sends the uplink service packet to a core network. Therefore, for the uplink service packet, the transmit end that sends the service packet to the base station is the terminal. The downlink service packet is sent by the SBC, and specifically, the SBC sends the downlink service packet to the base station by using an S-GW and a P-GW in the core network. Therefore, for the downlink service packet, the transmit end that sends the service packet to the base station is the SBC. For the foregoing different transmit ends that send service packets to the base station, the SBC adjusts the service rate in different manners. The following describes, in detail, service rate adjustment processing in different cases.

1. If a transmit end that sends a service packet to the base station is a terminal, and the terminal sends an uplink service packet to the base station, the adjusting a service rate of a transmit end according to the actual transmission capability information and the service rate of the transmit end that sends a service packet to the base station in step 102 may be specifically: increasing or decreasing a service rate of the terminal according to the actual transmission capability information, to obtain an increased or a decreased service rate; and sending a rate adjustment request message to the terminal, where the rate adjustment request message includes the increased or decreased service rate.

Specifically, the base station allocates an air interface transmission resource to transfer the service packet, and the actual transmission capability of the base station may be indicated by an amount of actual data that can be transmitted per second by the base station. For example, when an amount of data that can be transferred per second by the base station is large, the actual transmission capability of the base station is relatively high; or when an amount of data that can be transferred per second by the base station is small, the actual transmission capability of the base station is low. That the actual transmission capability is relatively high may be specifically: current transmission quality of the air interface of the base station is relatively good, or a service rate expected by the air interface is relatively high. Specifically, it may be set that when the amount of data that can be transferred per second is greater than a threshold, the actual transmission capability is relatively high, or when the amount of data that can be transferred per second is less than a threshold, the actual transmission capability is relatively low. Certainly, it may be understood that specific ranges may be set, and the ranges correspond to different actual transmission capabilities. For example, it is set that a first range corresponds to a relatively high actual transmission capability, and this range may be a numerical interval. When the amount of data that may be transferred per second by the base station falls within the first range, the actual transmission capability is relatively high. It should be noted that specific threshold and range settings may be flexibly made according to a requirement, and schematic description is merely used as an example herein. Further, when the actual transmission capability is relatively high, the service rate may be increased, so that the terminal uses a relatively high service rate for data transmission. When the actual transmission capability is relatively low, the service rate may be decreased, so that the terminal may use a relatively low service rate for service packet transmission, and further, so as to mitigate a problem of a large packet loss and a long delay caused due to a low actual transmission capability of the base station and a high service rate of the terminal.

In the foregoing steps, the actual transmission capability information of the base station may be learned, and it is learned, according to the actual transmission capability information, that the service rate of the terminal needs to be correspondingly adjusted. For specific adjustment processing, that is, for how to increase the service rate and decrease the service rate, the following explanatory description needs to be given. An example in which the actual transmission capability information is the service rate information expected by the air interface is used for description. An eNB may notify the SBC of the service rate information expected by the air interface. Assuming that the service rate information expected by the air interface is an uplink rate of 12.5K, the SBC may select a close service rate: If an AMR WB codec is currently used and the terminal supports all rates of the AMR WB codec, it may be learned, according to Table 2, that a service rate close to the service rate information 12.5K expected by the air interface is 12.65K, and the SBC instructs the terminal to adjust the rate to 12.65K; or if an AWR NB codec is currently used and the terminal supports all rates of the AMR NB codec, it may be learned, according to Table 1, that a service rate close to the service rate information 12.5K expected by the air interface is 12.2K, and the SBC instructs the terminal to adjust the rate to 12.2K.

An example in which the actual transmission capability information is the transmission quality information of the air interface is used for description. An eNB notifies the SBC of information that transmission quality of an air interface is good. In addition, if an AWR WB codec is currently used and the terminal supports all rates of the AMR WB codec, the SBC may increase the service rate of the terminal as far as possible because the transmission quality of the air interface is good. It may be learned, according to Table 2, that a maximum rate of the AMR WB codec is 23.85K, and the SBC instructs the terminal to adjust the rate to 23.85K. In the same codec, when an eNB notifies the SBC of information that transmission quality of an air interface is normal, the SBC instructs the terminal to adjust the rate to 12.65K. In the same codec, when an eNB notifies the SBC of information that transmission quality of an air interface is severely abnormal, the SBC instructs the terminal to adjust the rate to 6.6K, that is, the SBC decreases the service rate of the terminal as far as possible. In this embodiment, the actual transmission capability information is the transmission quality information of the air interface, and after the SBC obtains the transmission quality information of the air interface, how to adjust the service rate of the terminal may be flexibly set according to a requirement. The foregoing is merely an example, and imposes no limitation. It may be understood that, for example, when rates of the AMR WB codec that are supported by the terminal are 6.60K, 15.85K, and 23.0K, and when the eNB notifies the SBC of the information that the transmission quality of the air interface is good, the SBC instructs the terminal to adjust the rate to 23.0K. When the eNB notifies the SBC of the information that the transmission quality of the air interface is normal, the SBC instructs the terminal to adjust the rate to 15.85K. When the eNB notifies the SBC of the information that the transmission quality of the air interface is severely abnormal, the SBC instructs the terminal to adjust the rate to 6.60K. That is, different rates correspond to different transmission quality information of the air interface.

It may be learned from the foregoing description that a specific principle for adjusting the service rate may be flexibly set according to a requirement, and the foregoing examples impose no limitation herein.

2. If a transmit end that sends a service packet to the base station is an SBC, and the SBC sends a downlink service packet to the base station, the adjusting a service rate of a transmit end according to the actual transmission capability information and the service rate of the transmit end that sends a service packet to the base station in step 102 may be specifically: if the SBC does not perform codec conversion processing, increasing or decreasing a service rate of a peer end according to the actual transmission capability information; and sending a rate adjustment request message to the peer end, where the rate adjustment request message includes an increased or a decreased service rate.

It should be noted that the transmit end that sends a service packet to the base station is the SBC, that is, the SBC sends the downlink service packet to the base station, and there are also two cases: In case 1, the SBC does not perform codec conversion processing; and in case 2, the SBC performs codec conversion processing. Whether the SBC performs codec conversion processing is obtained according to SIP signaling negotiation performed between a call initiating end and a call receiving end, as performed between the UE and the peer in the Background. For case 1, the sending a rate adjustment request message to a peer device in the foregoing step is specifically used. For case 2, step 102 may be specifically: if the SBC performs codec conversion processing, increasing or decreasing a service rate of the SBC according to the actual transmission capability information, and sending the service packet to a terminal at an increased or a decreased service rate. That is, the SBC adjusts the service rate of the SBC, and sends the service packet to the base station at a service rate obtained after adjustment.

Further, in step 101, there may be multiple specific implementations of receiving actual transmission capability information of a base station sent by the base station, where the actual transmission capability information includes current transmission quality information of an air interface or service rate information expected by an air interface. For example, an eNB sends a message to an MME, the MME sends the message to an S-GW/P-GW, the S-GW/P-GW sends the message to a PCRF, and the PCRF sends the message to the SBC. The message may carry actual transmission capability information of the eNB, that is, current transmission quality information of an air interface or service rate information expected by an air interface. It should be noted that the S-GW/P-GW is used to indicate an integrated S-GW and P-GW. Certainly, the S-GW and the P-GW may alternatively be separately deployed, and a corresponding implementation is as follows: An eNB sends a message to an MME, the MME sends the message to the S-GW, the S-GW sends the message to the P-GW, the P-GW sends the message to the PCRF, and the PCRF sends the message to the SBC.

Another specific implementation may be used to implement that the SBC receives the actual transmission capability information of the base station sent by the base station. Specifically, the SBC receives a first application-defined Real-Time Transport Control Protocol packet (RTCP APP packet) sent by the base station, and obtains, from the first RTCP APP packet, current transmission quality information of an air interface of the base station or service rate information expected by an air interface.

The current transmission quality information of the air interface of the base station or the service rate information expected by the air interface is obtained by using an RTCP APP packet in RFC3550. "6.7 APP: Application-Defined RTCP Packet" in RCF3550 specifically describes a format and an application of the RTCP APP packet. The RTCP APP packet is an application that can be defined by a user, and if an RTCP APP packet that cannot be understood by a receiver itself is received, the RTCP APP packet is ignored and is not processed. A specific RTCP APP packet format is shown in FIG. 13.

An RFC specifically means a request for comments, and is a series of memos released by the Internet Engineering Task Force (IETF). Internet related information and UNIX and Internet community software documents are collected in the memos, and are arranged by number. Common Internet Protocol RFC numbers are IP: 791, DHCP: 2131, SIP: 3261, RTP: 3550, L2TP: 3931, and the like. The foregoing steps in this embodiment are modified accordingly based on the existing RFC3550, so that the SBC may obtain the actual transmission capability information of the base station.

In this embodiment, when an RTCP APP packet is used to transmit the actual transmission capability information of the base station, a subtype field is set to information indicating a transmitting direction. Specifically, an identifier 1 may be used to indicate that the RTCP APP packet is a request sent by the base station to an IMS. A specific parameter that may be carried in the identifier 1 includes the current transmission quality information of the air interface or the service rate information expected by the air interface. This parameter may be specifically carried in an application-dependent data field.

Specifically, a GTP tunnel is established between the eNB and the S-GW, and between the S-GW and the P-GW according to the GPRS tunneling protocol (GTP). After performing tunnel encapsulation on the RTCP APP packet, the eNB sends an encapsulated RTCP APP packet to the S-GW by using the GTP tunnel, the S-GW sends the encapsulated RTCP APP packet to the P-GW by using the GTP tunnel, and the P-GW performs decapsulation to obtain the RTCP APP packet, and sends the RTCP APP packet to the SBC.

Further, after the SBC adjusts the service rate, the SBC may further send a second RTCP APP packet to the base station, where the second RTCP APP packet carries an increased or a decreased service rate.

Specifically, the second RTCP APP packet uses a format the same as that of the first RTCP APP packet, and a difference lies in that a subtype field of the second RTCP APP packet uses an identifier different from that of the first RTCP APP packet. Specifically, the subtype field of the second RTCP APP packet may use an identifier 2 to indicate that the second RTCP APP packet is a response sent by the SBC to the base station, and an application-dependent data field in the response may specifically carry the increased or decreased service rate.

Specifically, the SBC sends the second RTCP APP packet to the P-GW. After performing tunnel encapsulation on the second RTCP APP packet, the P-GW sends an encapsulated second RTCP APP packet to the S-GW by using the GTP tunnel. The S-GW sends the encapsulated second RTCP APP packet to the eNB by using the GTP tunnel.

Further, if the service packet is a packet of a voice service, that is, for a voice service, the rate adjustment request message includes a codec mode request CMR of the service packet, where the CMR carries the increased or decreased service rate.

Accordingly, the sending a rate adjustment request message to the terminal, where the rate adjustment request message includes the increased or decreased service rate may be specifically: filling the increased or decreased service rate in the codec mode request (CMR) of the service packet, and sending, to the terminal, the service packet in which the CMR carries the increased or decreased service rate, that is, modifying a CMR in a payload carried by an RTP, and filling a corresponding rate, so that the terminal controls a used codec rate according to the CMR.

Accordingly, the sending a rate adjustment request message to the peer end, where the rate adjustment request message includes the increased or decreased service rate may be specifically: filling the increased or decreased service rate in the codec mode request CMR of the service packet, and sending, to the peer end, the service packet in which the CMR carries the increased or decreased service rate.

That is, for a voice service, when the service rate is adjusted, the increased or decreased service rate is sent to the terminal or the peer end by using the CMR.

If the service packet is a packet of a video service, that is, for a video service, the rate adjustment request message is specifically a temporary maximum media stream bit rate request message, where the temporary maximum media stream bit rate request message includes the increased or decreased service rate.

Accordingly, the sending a rate adjustment request message to the terminal, where the rate adjustment request message includes the increased or decreased service rate may be specifically: sending a temporary maximum media stream bit rate request message (TMMBR) to the terminal, where the temporary maximum media stream bit rate request message includes the increased or decreased service rate.

The sending a rate adjustment request message to the peer end, where the rate adjustment request message includes the increased or decreased service rate may be specifically: sending a temporary maximum media stream bit rate request message to the peer end, where the temporary maximum media stream bit rate request message includes the increased or decreased service rate.

That is, for a video service, during adjustment of the service rate, the increased or decreased service rate is sent to the terminal or the peer end by using the TMMBR.

It should be noted that the TMMBR herein is specifically a service type defined in RFC5104.

Further, for a video service, the SBC may further receive a temporary maximum media stream bit rate notification message (TMMBN) sent by the terminal or the peer end, where the temporary maximum media stream bit rate notification message is a response message for the temporary maximum media stream bit rate request message.

In this embodiment, the SBC obtains the actual transmission capability information of the base station, and further adjusts, according to the actual transmission capability information of the base station, the service rate of the transmit end that sends a service packet to the base station, so that the service rate of the transmit end that sends a service packet to the base station matches the actual transmission capability of the base station, thereby improving service data transmission quality.

Figure 4:
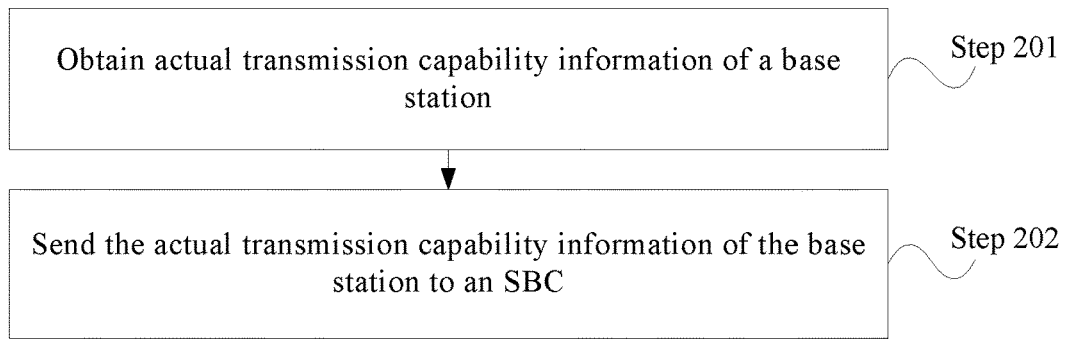
FIG. 4 is a flowchart of a second embodiment of a service rate adjustment method according to the present disclosure.

FIG. 4 is a flowchart of a second embodiment of a service rate adjustment method according to the present disclosure, and this embodiment is executed by a base station. For the network architecture shown in FIG. 2, the executing body may be specifically an eNB. As shown in FIG. 4, the method in this embodiment may include the following steps.

Step 201: Obtain actual transmission capability information of the base station.

Specifically, the base station may obtain the actual transmission capability information of the base station in real time.

If a transmission capability of an air interface of the base station changes, the base station obtains the actual transmission capability information of the base station. In a specific implementation, the base station may obtain the actual transmission capability information of the base station in real time. A preset condition may be set, and if the preset condition is met, step 202 is executed. The preset condition may be flexibly set according to a requirement, for example, the preset condition may be that current actual transmission capability information is different from previously obtained actual transmission capability information, or the preset condition may be that the actual transmission capability information is obtained. This is not limited herein. Transmission quality of the air interface of the base station is related to many factors, an important factor in the many factors is a distance between the terminal and the base station. If the distance between the terminal and the base station is short, the transmission quality of the air interface is good. If the distance between the terminal and the base station is long, the transmission quality is poor.

Step 202: Send the actual transmission capability information of the base station to an SBC.

The actual transmission capability information is used by the SBC to adjust a service rate of a transmit end according to the actual transmission capability information and the service rate of the transmit end that sends a service packet to the base station.

Further, the sending the actual transmission capability information of the base station to an SBC in step 202, where the actual transmission capability information includes current transmission quality information of an air interface or service rate information expected by an air interface may be specifically: adding the current transmission quality information of the air interface of the base station or the service rate information expected by the air interface to a first RTCP APP packet, and sending the first RTCP APP packet to the SBC. For a specific explanation of the first RTCP APP packet herein, refer to the embodiment shown in FIG. 3.

Further, the base station may further receive a second RTCP APP packet sent by the SBC, where the second RTCP APP packet carries an increased or a decreased service rate, and the increased or decreased service rate is a service rate obtained after the SBC adjusts the service rate of the transmit end according to the actual transmission capability information and the service rate of the transmit end that sends a service packet to the base station. For a specific explanation of the second RTCP APP packet herein, refer to the embodiment shown in FIG. 3. The second RTCP APP packet herein is used to notify, after the SBC adjusts the service rate of the transmit end according to the first RTCP APP packet and sends the second RTCP APP packet to the base station, the base station that the SBC already performs corresponding rate adjustment processing according to the actual transmission capability information of the base station, so as to avoid that the base station repeatedly sends a first RTCP APP packet of the same content.

In this embodiment, if the transmission capability of the base station changes, the actual transmission capability information of the base station is obtained, and the actual transmission capability information is sent to the SBC. The SBC performs adjustment processing according to the actual transmission capability information and the service rate of the transmit end that sends a service packet to the base station. That is, the base station in an access network and the SBC in a core network cooperate with each other, so that the service rate at which the service packet is sent to the base station matches the actual transmission capability of the base station, thereby improving data transmission quality.

The following uses several specific embodiments to describe in detail the technical solutions of the method embodiments shown in FIG. 3 and FIG. 4.

Figure 5:
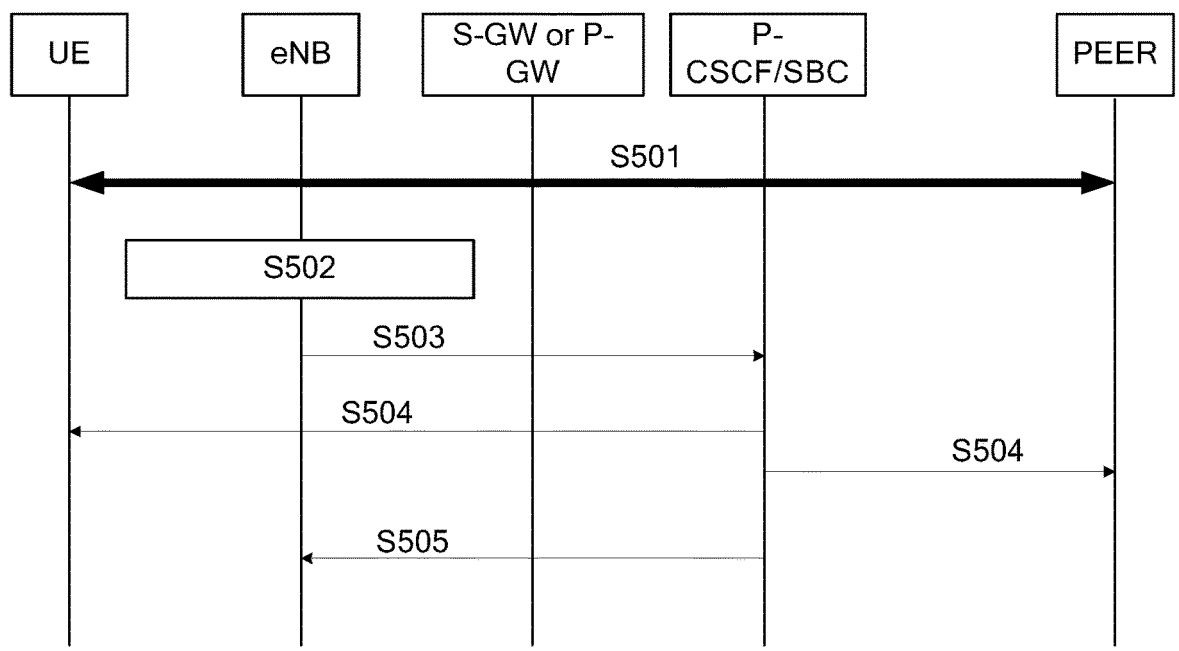
FIG. 5 is a signaling flowchart of a first embodiment of a service rate adjustment method according to the present disclosure.

FIG. 5 is a signaling flowchart of a first embodiment of a service rate adjustment method according to the present disclosure. This embodiment is an interaction implementation of the foregoing embodiments. This embodiment includes UE, an eNB, an S-GW, a P-GW, a P-CSCF/SBC, and a peer node peer. This embodiment may be applicable to a voice service, and may also be applicable to a video service. The method in this embodiment may include the following steps.

S501. Call signaling negotiation is performed between the UE, the P-CSCF/SBC, and the peer node peer.

After SIP signaling negotiation, bearer plane interaction is performed between the UE, the eNB, the S-GW, the P-GW, the P-CSCF/SBC, and the peer node peer. For example, the eNB receives an uplink data packet from the UE, and specifically transfers the data packet to the S-GW by using a GTP tunnel, the S-GW sends the data packet to the P-GW, and the P-GW obtains the data packet from the GTP tunnel and sends the data packet to the P-CSCF/SBC. In a downlink direction, the P-CSCF/SBC sends a downlink data packet to the P-GW, the P-GW sends the data packet to the S-GW by using a GTP tunnel, the S-GW sends the data packet to the eNB by using the GTP tunnel, and the eNB transfers the data packet to the UE by using an air interface. An RTP and an RTCP may be used during transmission of real-time data between the UE, the P-CSCF/SBC, and the peer node peer, to implement an end-to-end network transmission function. During transmission of real-time data, RTP and RTCP data packets may be sent between the eNB, the S-GW, and the P-GW by using the GTP tunnel. The P-CSCF/SBC is used to indicate an integrated P-CSCF and SBC.

S502. The eNB learns that actual transmission quality of an air interface changes.

Specifically, the eNB may obtain actual transmission quality information of the interface in real time, and when current obtained actual transmission capability information is different from a previously obtained actual transmission capability information, the eNB learns that the actual transmission quality of the air interface changes.

S503. The eNB sends a first RTCP APP packet to the P-CSCF/SBC by using the S-GW.

The first RTCP APP packet carries the actual transmission quality information of the air interface of the base station. For specific content of the actual transmission quality information of the air interface, refer to the explanatory description in the foregoing embodiment. Details are not described herein again. Specifically, the eNB sends the first RTCP APP packet to the S-GW, the S-GW sends the first RTCP APP to the P-GW, and the P-GW sends the first RTCP APP packet to the P-CSCF/SBC.

S504. The P-CSCF/SBC initiates, according to actual transmission quality information of the air interface of the base station, rate adjustment processing on a transmit end that sends a service packet to the eNB.

Specifically, if the service packet is an uplink service packet, rate adjustment processing on the UE is specifically started. If the service packet is a downlink service packet and the P-CSCF/SBC does not perform codec conversion processing, rate adjustment processing on the peer is specifically started. If the service packet is a downlink service packet and the P-CSCF/SBC performs codec conversion, rate adjustment processing on the P-CSCF/SBC is specifically started.

S505. The P-CSCF/SBC sends a second RTCP APP packet to the eNB.

The second RTCP APP packet carries a service rate obtained after rate adjustment processing on the UE or the peer is started by the P-CSCF/SBC.

In this embodiment, the eNB notifies the P-CSCF/SBC of the actual transmission capability information of the air interface of the eNB, and the P-CSCF/SBC initiates service rate adjustment according to a service status, so that the service rate obtained after rate adjustment processing matches an actual transmission capability, thereby improving data transmission quality.

Figure 6:
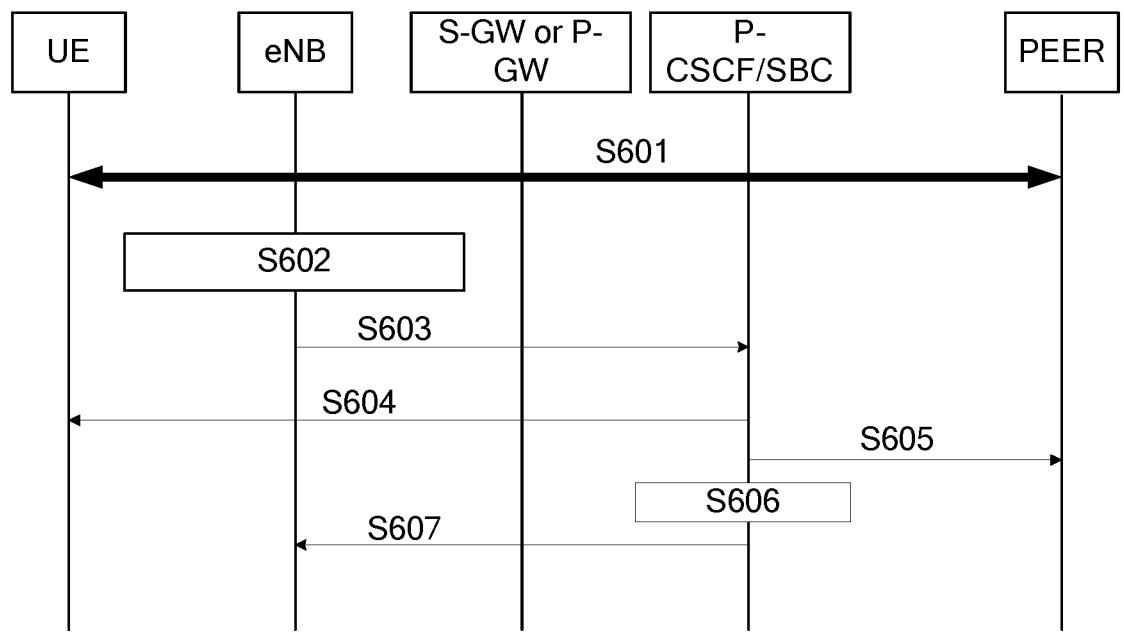
FIG. 6 is a signaling flowchart of a second embodiment of a service rate adjustment method according to the present disclosure.

FIG. 6 is a signaling flowchart of a second embodiment of a service rate adjustment method according to the present disclosure. This embodiment is based on the embodiment shown in FIG. 5, and provides specific explanatory description for a voice service. This embodiment includes UE, an eNB, an S-GW, a P-GW, a P-CSCF/SBC, and a peer node peer. The method in this embodiment may include the following steps.

S601. Call signaling negotiation is performed between the UE, the eNB, the S-GW, the P-GW, the P-CSCF/SBC, and the peer node peer.

S602. The eNB learns that actual transmission quality of an air interface changes.

S603. The eNB sends a first RTCP APP packet to the P-CSCF/SBC by using the S-GW.

S601 to S603 in this embodiment are the same as S501 to S503 in the embodiment shown in FIG. 5. For details, refer to the explanatory description in the foregoing embodiment. Details are not described herein again.

S604. If the first RTCP APP packet is in an uplink direction, the P-CSCF/SBC sends an RTP packet to the UE according to actual transmission quality information of the air interface of the base station.

Specifically, the P-CSCF/SBC increases or decreases an original service rate according to the actual transmission quality information of the air interface of the base station and rate set information supported by the UE, and adds an increased or a decreased service rate to a CMR in a payload of the Real-Time Transport Protocol (RTP) packet. After obtaining the CMR, the UE may perform corresponding adjustment on a codec rate of the UE.

S605. If the first RTCP APP packet is in a downlink direction and the P-CSCF/SBC does not perform codec conversion, the P-CSCF/SBC sends an RTP packet to the peer according to actual transmission quality information of the air interface of the base station.

The RTP packet is the same as the RTP packet in S604, that is, the increased or decreased service rate is filled in the CMR in the payload of the RTP packet. A difference from S604 lies in that the increased or decreased service rate is sent to the peer in S605.

S606. If the first RTCP APP packet is in a downlink direction and the P-CSCF/SBC performs codec conversion, the P-CSCF/SBC performs corresponding adjustment on a service rate of the P-CSCF/SBC according to actual transmission quality information of the air interface of the base station.

Specifically, the P-CSCF/SBC increases or decreases, according to the actual transmission quality information of the air interface of the base station, the service rate at which the P-CSCF/SBC sends a service packet, that is, sends the service packet to the base station at an increased or a decreased service rate.

It should be noted that there is no sequence for S604 to S606. S607 is executed after any one of S604 to S606 is executed.

S607. The P-CSCF/SBC sends a second RTCP APP packet to the eNB.

The second RTCP APP packet carries the service rate obtained after rate adjustment processing is started by the P-CSCF/SBC.

In this embodiment, for the voice service, the eNB notifies the P-CSCF/SBC of the actual transmission capability information of the air interface of the eNB, and the P-CSCF/SBC initiates service rate adjustment according to a service status, so that the service rate obtained after rate adjustment processing matches an actual transmission capability, thereby improving data transmission quality.

Figure 7:
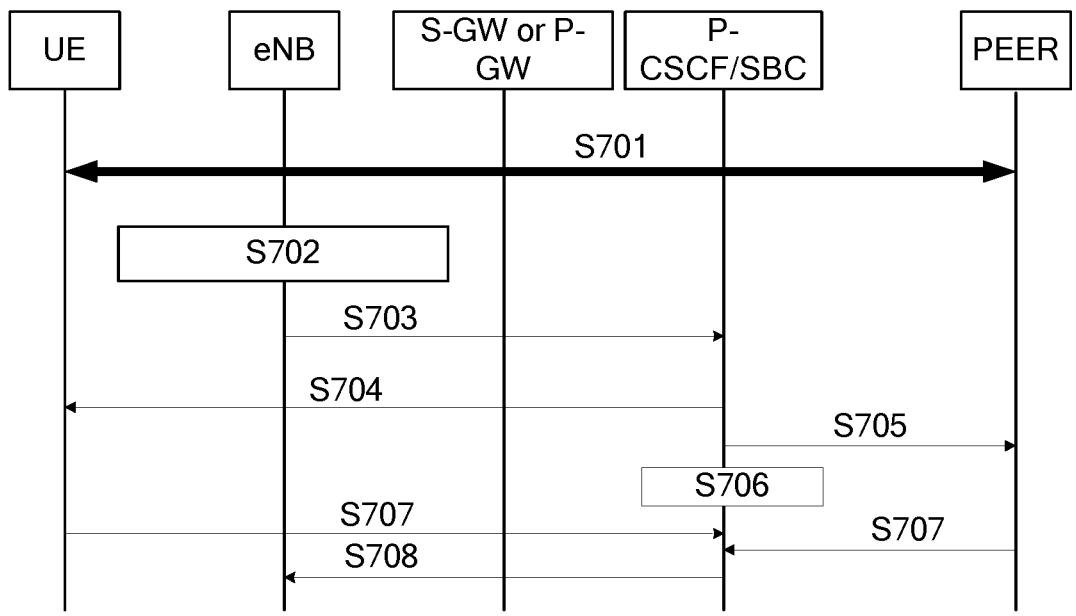
FIG. 7 is a signaling flowchart of a third embodiment of a service rate adjustment method according to the present disclosure.

FIG. 7 is a signaling flowchart of a third embodiment of a service rate adjustment method according to the present disclosure. This embodiment is based on the embodiment shown in FIG. 5, and provides specific explanatory description for a video service. This embodiment includes UE, an eNB, an S-GW, a P-GW, a P-CSCF/SBC, and a peer node peer. The method in this embodiment may include the following steps.

S701. Call signaling negotiation is performed between the UE, the eNB, the S-GW, the P-GW, the P-CSCF/SBC, and the peer node peer.

S702. The eNB learns that actual transmission quality of an air interface changes.

S703. The eNB sends a first RTCP APP packet to the P-CSCF/SBC by using the S-GW.

S701 to S703 in this embodiment are the same as S601 to S603 in the embodiment shown in FIG. 6. For details, refer to the explanatory description in the foregoing embodiment. Details are not described herein again.

S704. If the first RTCP APP packet is in an uplink direction, the P-CSCF/SBC sends a TMMBR to the UE according to actual transmission quality information of the air interface of the base station.

The TMMBR carries a service rate increased or decreased by the P-CSCF/SBC according to the actual transmission quality information of the air interface of the base station.

S705. If the first RTCP APP packet is in a downlink direction and the P-CSCF/SBC does not perform codec conversion, the P-CSCF/SBC sends a TMMBR to the peer according to actual transmission quality information of the air interface of the base station.

Specifically, the TMMBR herein carries the service rate increased or decreased by the P-CSCF/SBC according to the actual transmission quality information of the air interface of the base station, which is the same as that of S704. A difference from S704 lies in that the TMMBR is sent to the peer.

S706. If the first RTCP APP packet is in a downlink direction and the P-CSCF/SBC performs codec conversion, the P-CSCF/SBC performs corresponding adjustment on a service rate of the P-CSCF/SBC according to actual transmission quality information of the air interface of the base station.

Specifically, the P-CSCF/SBC increases or decreases, according to the actual transmission quality information of the air interface of the base station, the service rate at which the P-CSCF/SBC sends a service packet, that is, sends the service packet to the base station at an increased or a decreased service rate.

It should be noted that there is no sequence for S704 to S706. S707 is executed after any one of S704 or S705 is executed. S708 is executed after S706 is executed.

S707. The UE or the peer sends a TMMBN to the P-CSCF/SBC.

The TMMBN is a response message for the TMMBR in S704.

S708. The P-CSCF/SBC sends a second RTCP APP packet to the eNB.

The second RTCP APP packet carries the service rate obtained after rate adjustment processing is started by the P-CSCF/SBC.

In this embodiment, for the video service, the eNB notifies the P-CSCF/SBC of the actual transmission capability information of the air interface of the eNB, and the P-CSCF/SBC initiates service rate adjustment according to a service status, so that the service rate obtained after rate adjustment processing matches an actual transmission capability, thereby improving data transmission quality.

Figure 8:
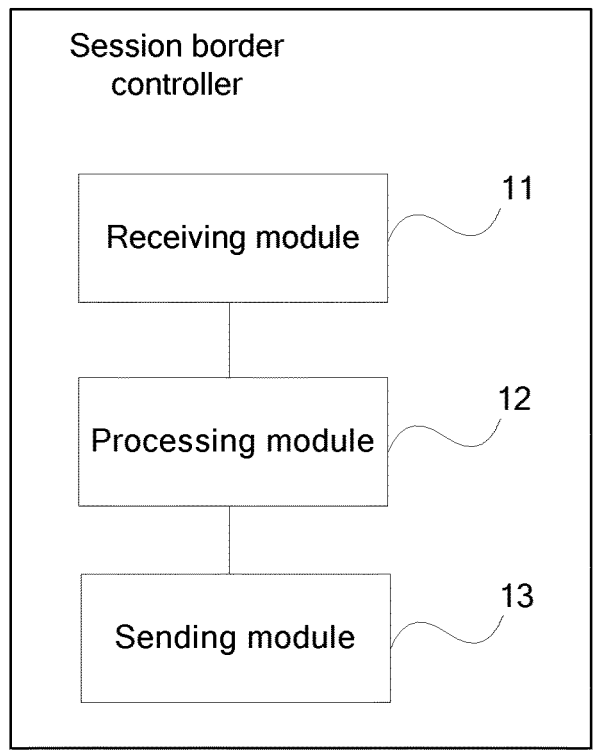
FIG. 8 is a schematic structural diagram of a first embodiment of a session border controller according to the present disclosure.

FIG. 8 is a schematic structural diagram of a first embodiment of a session border controller according to the present disclosure. As shown in FIG. 8, the apparatus in this embodiment may include a receiving module 11 and a processing module 12. The receiving module 11 is configured to receive actual transmission capability information of a base station sent by the base station. The processing module 12 is configured to adjust a service rate of a transmit end according to the actual transmission capability information and the service rate of the transmit end that sends a service packet to the base station.

Further, there are three implementable manners.

In manner 1, the transmit end that sends a service packet to the base station is a terminal, and the processing module 12 is specifically configured to increase or decrease a service rate of the terminal according to the actual transmission capability information, to obtain an increased or a decreased service rate. The SBC further includes a sending module 13, where the sending module 13 is configured to send a rate adjustment request message to the terminal, and the rate adjustment request message includes an increased or a decreased service rate.

In manner 2, the transmit end that sends a service packet to the base station is the session border controller SBC, and the processing module 12 is specifically configured to: if the SBC does not perform codec conversion processing, increase or decrease a service rate of a peer end according to the actual transmission capability information. The SBC further includes a sending module 13, where the sending module 13 is configured to send a rate adjustment request message to the peer end, and the rate adjustment request message includes an increased or a decreased service rate.

In manner 3, the transmit end that sends a service packet to the base station is the session border controller SBC, and the processing module 12 is specifically configured to: if the SBC performs codec conversion processing, increase or decrease a service rate of the SBC according to the actual transmission capability information, and send the service packet to a terminal at an increased or a decreased service rate.

Further, the receiving module 11 is specifically configured to: receive a first RTCP APP packet sent by the base station, and obtain the actual transmission capability information of the base station from the first RTCP APP packet, where the actual transmission capability information includes current transmission quality information of an air interface or service rate information expected by an air interface.

Further, the sending module 13 of the SBC is further configured to send a second RTCP APP packet to the base station, where the second RTCP APP packet carries the increased or decreased service rate.

Further, the service packet is a packet of a voice service, the rate adjustment request message includes a codec mode request CMR of the service packet, and the CMR carries the increased or decreased service rate.

Further, the service packet is a packet of a video service, and the rate adjustment request message is specifically a temporary maximum media stream bit rate request message, where the temporary maximum media stream bit rate request message includes the increased or decreased service rate.

Further, the receiving module 11 is further configured to receive a temporary maximum media stream bit rate notification message, where the temporary maximum media stream bit rate notification message is a response message for the temporary maximum media stream bit rate request message. The temporary maximum media stream bit rate notification message may be sent by the terminal, or may be sent by the peer end.

The apparatus in this embodiment may be configured to execute the technical solution of the method embodiment shown in FIG. 3. Implementation principles and technical effects thereof are similar. Details are not described herein again.

Figure 9:
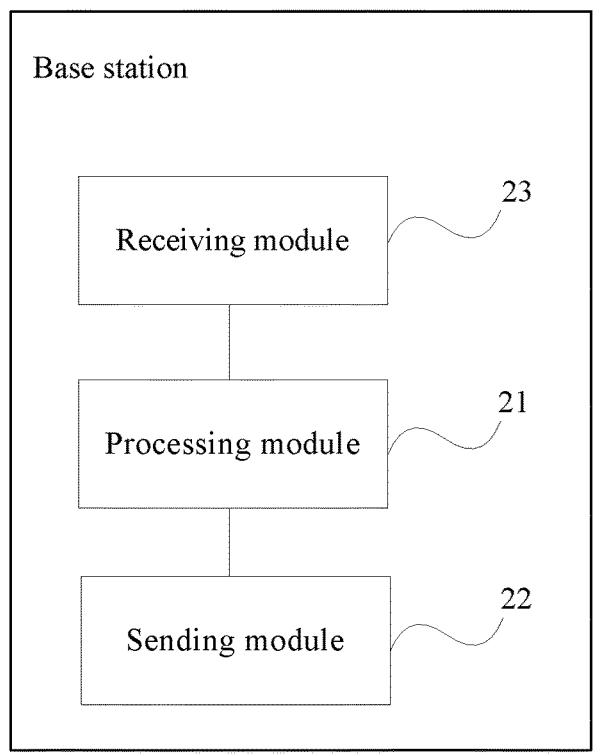
FIG. 9 is a schematic structural diagram of a first embodiment of a base station according to the present disclosure.

FIG. 9 is a schematic structural diagram of a first embodiment of a base station according to the present disclosure. As shown in FIG. 9, the apparatus in this embodiment may include a processing module 21 and a sending module 22. The processing module 21 is configured to obtain actual transmission capability information of the base station. The sending module 22 is configured to send the actual transmission capability information of the base station to a session border controller SBC, where the actual transmission capability information is used by the SBC to adjust a service rate of a transmit end according to the actual transmission capability information and the service rate of the transmit end that sends a service packet to the base station.

Further, the sending module 22 is specifically configured to: add the actual transmission capability information of the base station to a first RTCP APP packet, and send the first RTCP APP packet to the SBC.

Further, the base station further includes a receiving module 23, configured to receive a second RTCP APP packet sent by the SBC, where the second RTCP APP packet carries an increased or a decreased service rate, and the increased or decreased service rate is a service rate obtained after the SBC adjusts the service rate of the transmit end according to the actual transmission capability information and the service rate of the transmit end that sends a service packet to the base station.

The apparatus in this embodiment may be configured to execute the technical solution of the method embodiment shown in FIG. 4. Implementation principles and technical effects thereof are similar. Details are not described herein again.

Figure 10:
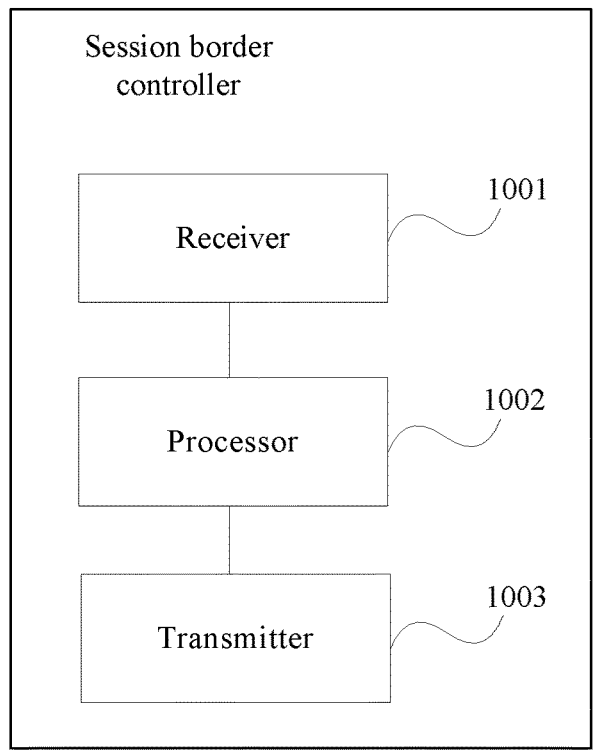
FIG. 10 is a schematic structural diagram of a second embodiment of a session border controller according to the present disclosure.

FIG. 10 is a schematic structural diagram of a second embodiment of a session border controller according to the present disclosure. As shown in FIG. 10, the device in this embodiment may include a receiver 1001 and a processor 1002. The receiver 1001 is configured to receive actual transmission capability information of a base station sent by the base station. The processor 1002 is configured to adjust a service rate of a transmit end according to the actual transmission capability information and the service rate of the transmit end that sends a service packet to the base station.

Further, the transmit end that sends a service packet to the base station is a terminal, and the processor 1002 is specifically configured to increase or decrease a service rate of the terminal according to the actual transmission capability information. The session border controller further includes a transmitter 1003, configured to send a rate adjustment request message to the terminal, where the rate adjustment request message includes an increased or a decreased service rate.

Further, the transmit end that sends a service packet to the base station is the session border controller SBC, and the processor 1002 is specifically configured to: if the SBC does not perform codec conversion processing, increase or decrease a service rate of a peer end according to the actual transmission capability information. The session border controller further includes a transmitter 1003, configured to send a rate adjustment request message to the peer end, where the rate adjustment request message includes an increased or a decreased service rate.

Alternatively, the processor 1002 is specifically configured to: if the SBC performs codec conversion processing, increase or decrease a service rate of the SBC according to the actual transmission capability information, and send the service packet to a terminal at an increased or a decreased service rate.

Further, the receiver 1001 is configured to receive the actual transmission capability information of the base station sent by the base station, specifically including: receiving a first RTCP APP packet sent by the base station, and obtaining the actual transmission capability information of the base station from the first RTCP APP packet, where the actual transmission capability information includes current transmission quality information of an air interface or service rate information expected by an air interface.

The transmitter 1003 is further configured to send a second RTCP APP packet to the base station, where the second RTCP APP packet carries the increased or decreased service rate.

Further, the service packet is a packet of a voice service, the rate adjustment request message includes a codec mode request CMR of the service packet, and the CMR carries the increased or decreased service rate.

Further, the service packet is a packet of a video service, and the rate adjustment request message may be specifically a temporary maximum media stream bit rate request message, where the temporary maximum media stream bit rate request message includes the increased or decreased service rate.

Further, the receiver 1001 is further configured to receive a temporary maximum media stream bit rate notification message, where the temporary maximum media stream bit rate notification message is a response message for the temporary maximum media stream bit rate request message. The temporary maximum media stream bit rate notification message may be sent by the terminal, or may be sent by the peer end.

The apparatus in this embodiment may be configured to execute the technical solution of the method embodiment shown in FIG. 3. Implementation principles and technical effects thereof are similar. Details are not described herein again.

Figure 11:
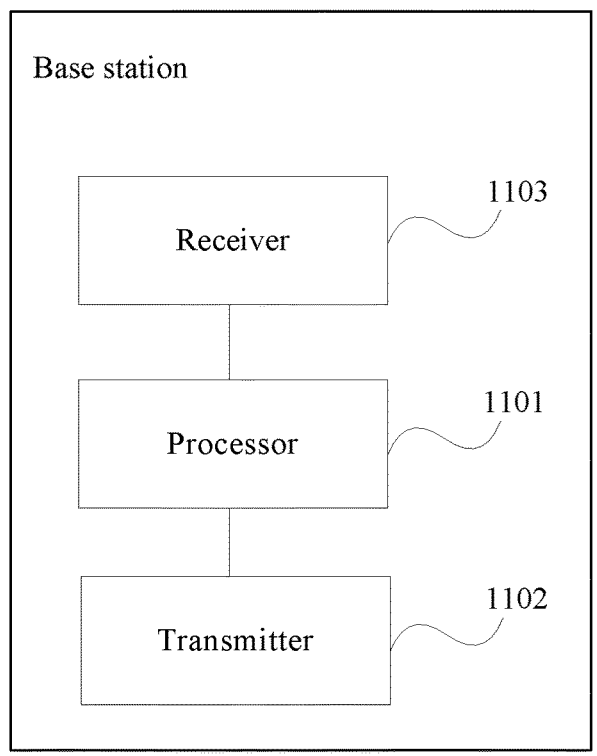
FIG. 11 is a schematic structural diagram of a second embodiment of a base station according to the present disclosure.

FIG. 11 is a schematic structural diagram of a second embodiment of a base station according to the present disclosure. As shown in FIG. 11, the device in this embodiment may include a processor 1101 and a transmitter 1102. The processor 1101 is configured to obtain actual transmission capability information of the base station. The transmitter 1102 is configured to send the actual transmission capability information of the base station to a session border controller SBC, where the actual transmission capability information is used by the SBC to adjust a service rate of a transmit end according to the actual transmission capability information and the service rate of the transmit end that sends a service packet to the base station.

Further, the transmitter 1102 is configured to send the actual transmission capability information of the base station to the SBC, specifically including: adding the actual transmission capability information of the base station to a first RTCP APP packet, and sending the first RTCP APP packet to the SBC, where the actual transmission capability information includes current transmission quality information of an air interface or service rate information expected by an air interface.

The base station may further include a receiver 1103, configured to receive a second RTCP APP packet sent by the SBC, where the second RTCP APP packet carries an increased or a decreased service rate, and the increased or decreased service rate is a service rate obtained after the SBC adjusts the service rate of the transmit end according to the actual transmission capability information and the service rate of the transmit end that sends a service packet to the base station.

The apparatus in this embodiment may be configured to execute the technical solution of the method embodiment shown in FIG. 4. Implementation principles and technical effects thereof are similar. Details are not described herein again.

Figure 12:
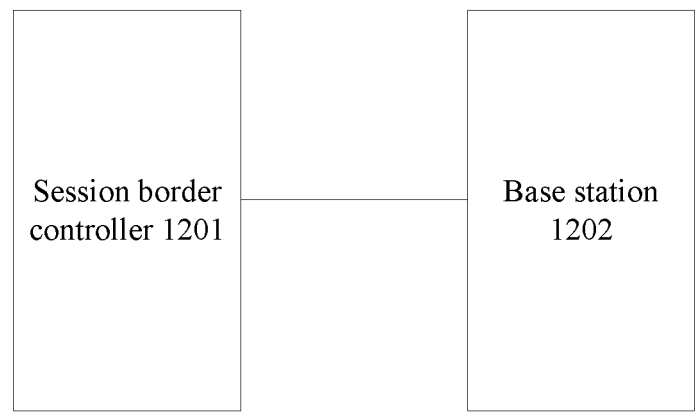
FIG. 12 is a schematic structural diagram of an embodiment of a service rate adjustment system according to the present disclosure.

FIG. 12 is a schematic structural diagram of an embodiment of a service rate adjustment system according to the present disclosure. As shown in FIG. 12, the system in this embodiment includes a session border controller 1201 and a base station 1202. The session border controller 1201 may use the structure of the apparatus embodiment shown in FIG. 8 or the structure of the device embodiment shown in FIG. 10, and correspondingly, may execute the technical solution of any one of the method embodiments shown in FIG. 3 to FIG. 7. Implementation principles and technical effects thereof are similar. Details are not described herein again. The base station 1202 may use the structure of the apparatus embodiment shown in FIG. 9 or the structure of the device embodiment shown in FIG. 11, and correspondingly, may execute the technical solution of any one of the method embodiments shown in FIG. 3 to FIG. 7. Implementation principles and technical effects thereof are similar. Details are not described herein again.

It should be noted that the receiving module 11 in the embodiments of the present disclosure may correspond to the receiver of the session border controller, or may correspond to a transceiver of the session border controller. The sending module 13 may correspond to the transmitter of the session border controller, or may correspond to a transceiver of the session border controller. The processing module 12 may correspond to the processor of the session border controller. The processor herein may be a central processing unit (CPU), or an application-specific integrated circuit (ASIC), or one or more integrated circuits that implement the embodiments of the present disclosure. The session border controller may further include a memory. The memory is configured to store instruction code, and the processor invokes the instruction code in the memory to control the receiving module 11 and the sending module 13 in the embodiments of the present disclosure to execute the foregoing operations.

The sending module 22 in this embodiment of the present disclosure may correspond to the transmitter of the base station, or may correspond to a transceiver of the base station. The receiving module 23 may correspond to the receiver of the base station, or may correspond to a transceiver of the base station. The processing module 21 may correspond to the processor of the base station, and the processor herein may be a CPU, or an ASIC, or one or more integrated circuits that implement the embodiments of the present disclosure. The base station may further include a memory. The memory is configured to store instruction code, and the processor invokes the instruction code in the memory to control the sending module 22 and the receiving module 23 in the embodiments of the present disclosure to execute the foregoing operations.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A service rate adjustment method performed by a session border controller (SBC), the method comprising:
receiving a first application-defined Real-Time Transport Control Protocol packet (RTCP APP packet) sent by a base station;
obtaining an actual transmission capability information of the base station from the first RTCP APP packet, wherein the actual transmission capability information comprises current transmission quality information of an air interface or service rate information expected by an air interface;
adjusting a service rate of the SBC according to the actual transmission capability information, wherein adjusting the service rate of the SBC comprises performing codec conversion processing; and
sending a service packet to the base station at an increased or a decreased service rate.

2. A service rate adjustment method performed by a session border controller (SBC), the method comprising:
receiving a first application-defined Real-Time Transport Control Protocol packet (RTCP APP packet) sent by a base station;
obtaining an actual transmission capability information of the base station from the first RTCP APP packet, wherein the actual transmission capability information comprises current transmission quality information of an air interface or service rate information expected by an air interface;

adjusting a service rate of a terminal that is sending a service packet to the base station according to the actual transmission capability information without performing codec conversion processing; and sending a rate adjustment request message to the terminal, wherein the rate adjustment request message comprises an increased or a decreased service rate.

3. The method according to claim 2, further comprising:

sending a second RTCP APP packet to the base station, wherein the second RTCP APP packet carries the increased or decreased service rate.

4. A session border controller, comprising:

a transceiver configured to receive a first application-defined Real-Time Transport Control Protocol packet (RTCP APP) packet sent by a base station;

one or more processors; and a non-transitory computer-readable memory storing a program that, when executed by the one or more processors, causes the session border controller to:

obtain an actual transmission capability information of the base station from the first RTCP APP packet, wherein the actual transmission capability information comprises current transmission quality information of an air interface or service rate information expected by an air interface;

adjust a service rate of the SBC according to the actual transmission capability information, wherein adjusting the service rate of the SBC comprises performing codec conversion processing; and cause the transceiver to send a service packet to the base station at an increased or a decreased service rate.

5. A session border controller, comprising:

a transceiver configured to receive a first application-defined Real-Time Transport Control Protocol packet (RTCP APP) packet sent by a base station;

one or more processors; and a non-transitory computer-readable memory storing a program that, when executed by the one or more processors, causes the session border controller to:

obtain an actual transmission capability information of the base station from the first RTCP APP packet, wherein the actual transmission capability information comprises current transmission quality information of an air interface or service rate information expected by an air interface;

adjust a service rate of a terminal that is sending a service packet to the base station according to the actual transmission capability information without performing codec conversion processing; and cause the transceiver to send a rate adjustment request message to the terminal, wherein the rate adjustment request message comprises an increased or a decreased service rate.

6. The session border controller according to claim 5, wherein the transceiver is further configured to:

send a second RTCP APP packet to the base station, wherein the second RTCP APP packet carries the increased or decreased service rate.

* * * * *